Feb. 24, 1948. R. K. POTTER 2,436,402
METHOD OF LAYING COMMUNICATION LINES
Filed Sept. 8, 1944   2 Sheets-Sheet 1

INVENTOR
R.K. POTTER
BY J. MacDonald
ATTORNEY

Feb. 24, 1948. R. K. POTTER 2,436,402
METHOD OF LAYING COMMUNICATION LINES
Filed Sept. 8, 1944 2 Sheets-Sheet 2
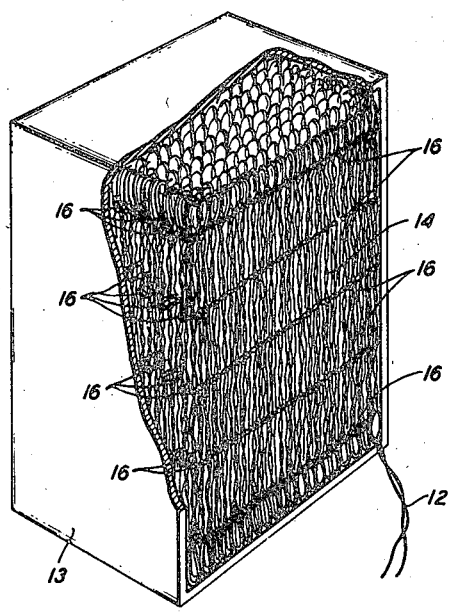
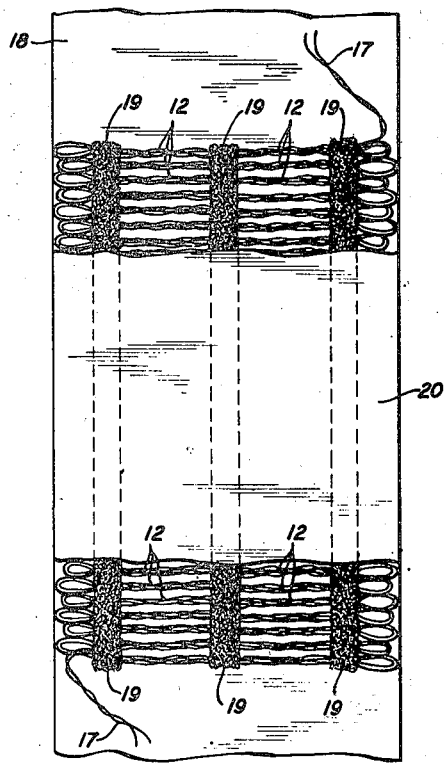
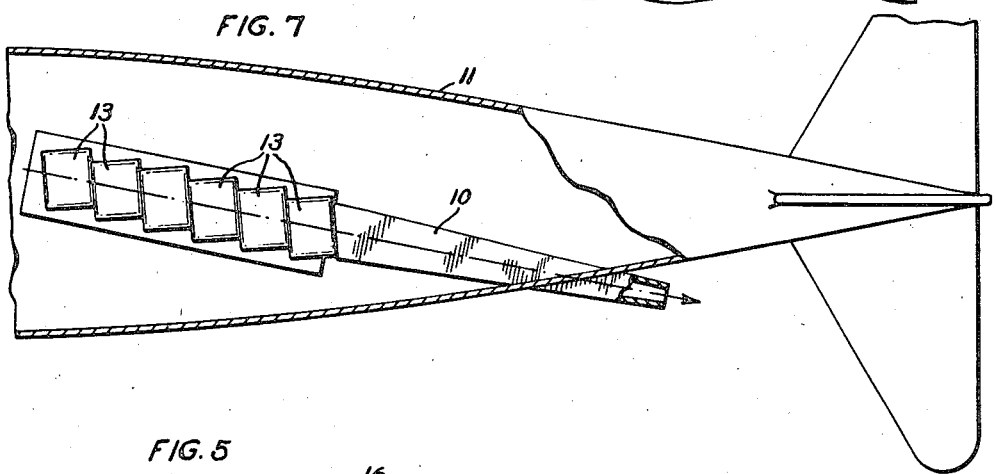
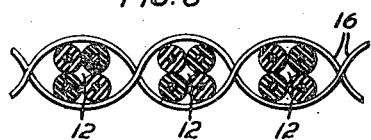
INVENTOR
R. K. POTTER
BY J. MacDonald
ATTORNEY Patented Feb. 24, 1948

2,436,402

UNITED STATES PATENT OFFICE 2,436,402

METHOD OF LAYING COMMUNICATION LINES

Ralph K. Potter, Morristown, N. J., assignor to Bell Telephone Laboratories, Incorporated, New York, N. Y., a corporation of New York Application September 8, 1944, Serial No. 553,272

2 Claims. (Cl. 175—376)

This invention relates to the laying of wires from fast moving vehicles and particularly to the laying of communication wires from airplanes.

The object of this invention is the provision of a method and means for laying communication wires from fast moving vehicles which permits the wires to be payed out rapidly without entangling and without damage to the wires.

Another object of the invention is the provision of preformed packages of wire, each containing a substantial length of wire, which may be placed in echelon in the vehicle and spliced together to facilitate the laying of communication lines of considerable length and which permits the wire to be fed therefrom without undue friction.

In those instances where it is not feasible or possible to erect poles and install open wire lines or bury wire or cable in the ground, for example, in forward combat areas and where communication must be established with all possible speed with advance units, I propose to establish these lines of communication by means of laying wires from fast moving vehicles.

In some instances the wire may be laid from fast moving motor vehicles where the terrain is such that will permit the travel of such vehicles. In other instances I propose to lay the wires from an airplane traveling at high speed over the proposed area.

The laying of communication wires from fast moving motor vehicles or airplanes traveling at high rates of speed present many difficult problems, for example, the wire must be released in such a manner from the plane, which is traveling at speeds of from 150 to 250 miles per hour, in such a manner that the wire will not be ruptured. The wire cannot simply be unwound from a spool and fed out of the airplane inasmuch as dangerous tensions, sufficient to break the wire, would result.

In paying out wire at low speed twists become kinks and can be absorbed by the wire without damage thereto.

Apparently the reason for the difficulties encountered in the high speed laying of communication wires is that the speed of the wire released approaches or even exceeds the velocity of propagation of disturbances such as bends and stresses along the wire. This velocity cannot be expressed very definitely because it is a function of wire tension and various characteristics of the wire itself.

I have found that if the wire, which is to be released from the fast moving vehicle, is packaged properly the wire will pay out easily and steadily and in such a manner that the tendency to twist will be avoided.

In accordance with this invention, which contemplates the provision of a method and means for facilitating the laying of communication wires from fast moving vehicles, I provide preformed packages, each containing a considerable length of wire.

In one embodiment of my invention the wire is woven back and forth on itself to form a flat strip and is held in place by means of frangible threads or cords. The wires in the strip form the woof of the weave and the cords form the warp.

The strip of woven wire and cord is folded back and forth upon itself in pleated fashion, compressed together and placed in a suitable container which permits access to the ends of the wires so that they may be spliced to the ends of the wire in the adjoining packages.

A suitable weight, which is attached to the free ends of the wires, is thrown out of the airplane causing the wires to be fed through a flume or guide located in the body of the airplane and which is open to the outside atmosphere. The flight of the airplane causes the wires to pass through the flume and due to the weight, settle to the earth or on trees or bushes as the case may be. As the airplane continues in its flight the wires will continue to be payed out from the preformed packages with the consequent rupturing of the warp cords which hold the wires in position to prevent tangling. The cords which hold the wires in place, that is the warp, are sufficiently strong to hold the wires in place in the package but will readily rupture as the wires are payed out.

In a modified form of the packaging means I dispense with the use of threads or cords and use an adhesive to hold the wires in place. In this form the wires are positioned on a strip of paper, a suitable adhesive is applied over the wire, and a second layer of paper positioned on top thereof. The flat strip of wire and paper so formed is then folded in pleated fashion and packaged in a suitable container.

If desirable, the paper strips may be dispensed with and the wires held solely in place by means of the adhesive and subsequently pressed in suitable bales in pleated fashion as heretofore described with regard to the preferred method of packing the wire of my invention.

However, my invention is not to be limited to the above specific types of packages or to any particular type of package but includes any suitable package which releases the wire easily and steadily and in such a way as to avoid tendency to twist, kink or snarl.

My invention will be more readily understood from the following detailed description made with reference to the accompanying drawing of which Fig. 1 is a fragmentary side view with portions broken away of the tail section of an airplane with the wires being payed out therefrom in accordance with this invention;

Fig. 4 is a view in perspective of the finished package or bale in the position it will occupy in the vehicle;

Fig. 5 is an enlarged fragmentary cross-sectional view taken on line 5—5 of Fig. 3;

Fig. 6 is a top plan view with portions broken away of a modified form of means for securing the wires in place, and Fig. 7 is a top plan view of Fig. 1 with portions of the fuselage broken away to show the interior of the plane and the arrangement of the packaged wire.

Figure 1:
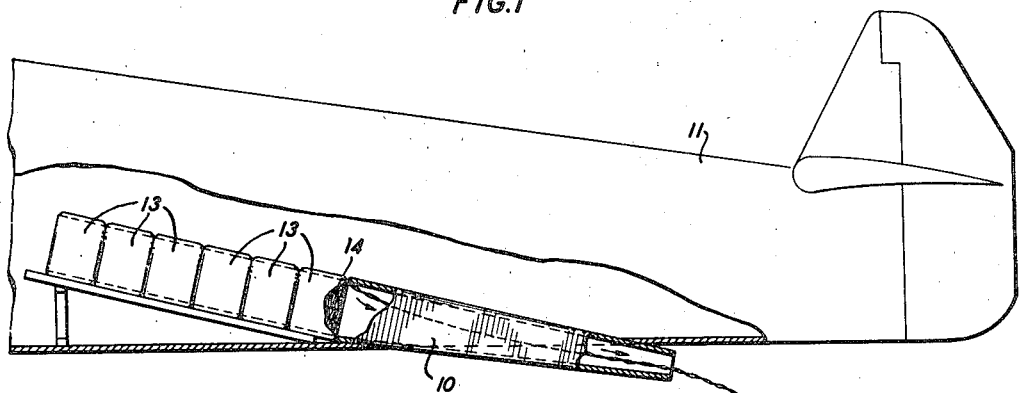

In accordance with the preferred embodiment of my invention as shown in Fig. 1, I have provided a suitable guide or flume 10 in the fuselage of the plane 11 at the rear thereof. The flume 10 is positioned so that it will not interfere with the operation of the plane and so that the wires 12 which are being fed therefrom can be payed out accurately and laid in position without becoming entangled in the plane. Suitably mounted on the interior of the plane 10, preferably in echelon fashion, as shown in Fig. 7, and in abutting relationship with the flume 10, are a series of frames 13, one of which is shown in Fig. 4. Each of these frames contains substantial lengths of wire in package form which is spliced to its neighbor in the adjacent frame to form a continuous unbroken length of wires 12.

As shown in Fig. 1 the wires 12 which make up the packages in the frames 13, and having a suitable weight "W" secured to the free or starting end thereof, are fed from the package through the flume 10 and thence out of the plane. Any number of frames each containing a package of wire may be mounted in echelon to provide the desired length of wire.

Figure 2:
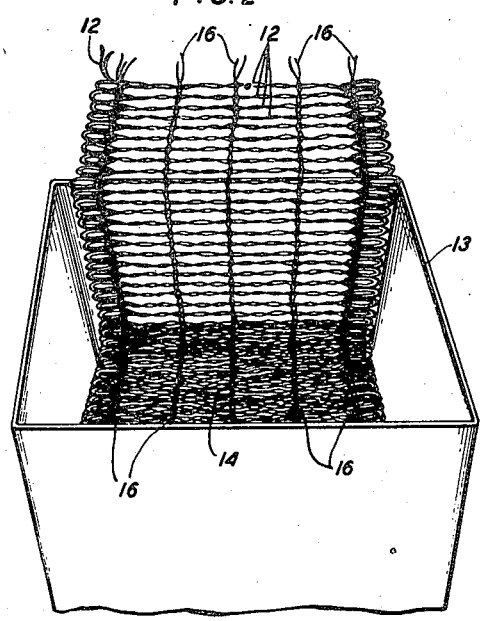
Fig. 2 is a view in perspective, illustrating the manner in which the flat strip of woven wires and cords is placed in pleated fashion in a suitable container.
Figure 3:
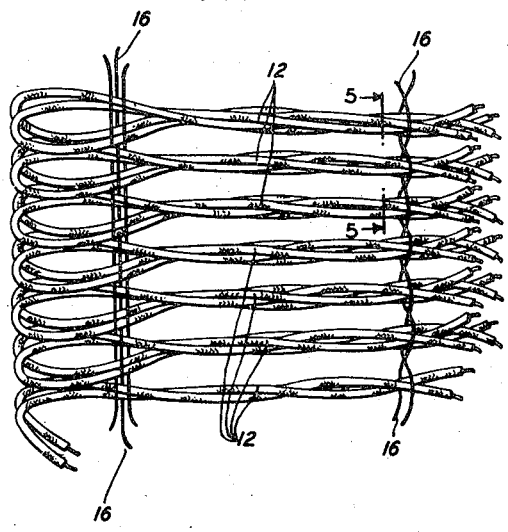
Fig. 3 is an enlarged fragmentary plan view of the woven strip illustrating the manner in which the wires are held in position by the cords.

As shown in Figs. 2, 3 and 4 the wire package or bale 14 which is contained in the frame 13, is made up of a plurality of strands of wire 12 or it may be made up of a single strand of wire as the occasion demands. This wire is woven back and forth on itself and stitched together by means of the cords 16. The cords 16 form the warp and are readily frangible to permit the wires to leave the package but are sufficiently strong to hold the wires which form the weft in position.

The flat woven strip of wires and cords, as shown in Fig. 2, and in detail in Fig. 3 is placed in the frame 13 in pleated fashion and is pressed together tightly to form a package or bale 14 with the ends of the wires exposed as shown in Fig. 4.

In this manner a considerable amount of wire may be confined in a relatively small place and the wires may be payed out of the plane at very high speed and laid with a reasonable amount of accuracy without undue strain on the wires and without tangling the wires and the consequent damage thereto which would attend such tangling as the wires are being payed out.

In the modified form of my invention, as shown in Fig. 6, instead of stitching the wires with cords, I place the flattened wire loops of the wire 17 in position on a strip of paper or other suitable material 18 which is readily frangible. I then apply a series of strips of a suitable adhesive 19 over the wire to bind the wires together and secure them to the strip of paper 18. Over the wire 17 and the adhesive 19 I place a second strip 20 of similar material and press it firmly in contact with the wire. The flat composite strip of wire and paper so formed is then folded in pleated fashion and placed in the frame as heretofore described with regard to the preferred form of my invention.

The wire from this package is fed out of the plane or vehicle in the same manner as heretofore described with regard to the stitched wire package and the paper fractures, and the adhesive gives way as the wire is fed out of the plane.

While I have shown and described herein the preferred embodiment of my invention, it is to be understood that various changes and modifications may be made therein without departing from the spirit of the invention and that I am only limited by the scope of the appended claims.

What is claimed is:

1. The method of laying communication wires from airborne vehicles which comprises storing in echelon aboard the vehicle suitable containers each housing a preformed package of wire, splicing the lengths of wire in the packages to form a continuous unbroken length of wire, securing to the starting end of the length of wire so formed a suitable weight, throwing said weight into space to accurately position the wires as they come to rest, and paying said wires by the forward motion of said vehicle uninterruptedly out of said vehicle from the first and succeeding packages through a suitable guide as said vehicle traverses a predetermined course at high speed.

2. The method of laying communication wires from airborne vehicles which comprises storing in echelon aboard the vehicle suitable containers each housing a preformed package of wire, positioning said containers so that the vertical axes thereof are parallel and in alignment, splicing the lengths of wire in the packages to form a continuous unbroken length of wire, securing to the starting end of the length of wire so formed a suitable weight, throwing said weight into space to accurately position the wires as they come to rest, and paying said wires by the forward motion of said vehicle uninterruptedly out of said vehicle from the first and succeeding packages through a suitable guide as said vehicle traverses a predetermined course at high speed.

RALPH K. POTTER.

REFERENCES CITED

The following references are of record in the file of this patent:

UNITED STATES PATENTS

| Number | Name | Date |
| --- | --- | --- |
| 906,547 | Moss | Dec. 15, 1908 |
| 1,842,164 | Gross | Jan. 19, 1932 |
| 2,161,044 | Heintz et al. | June 6, 1939 |
| 2,223,110 | Kempe | Nov. 26, 1940 |
| 2,320,798 | Runquist et al. | June 1, 1943 |
| 2,336,051 | Young | Dec. 7, 1943 |
| 1,778,284 | Swanson | Oct. 14, 1930 |

FOREIGN PATENTS

| Number | Country | Date |
| --- | --- | --- |
| 270,555 | Germany | Feb. 18, 1914 |